Jan. 6, 1942.　　　K. D. HORTON　　　2,268,826
VENT VALVE CONTROL FOR TRIPLE VALVES
Filed Feb. 19, 1940　　　2 Sheets-Sheet 1
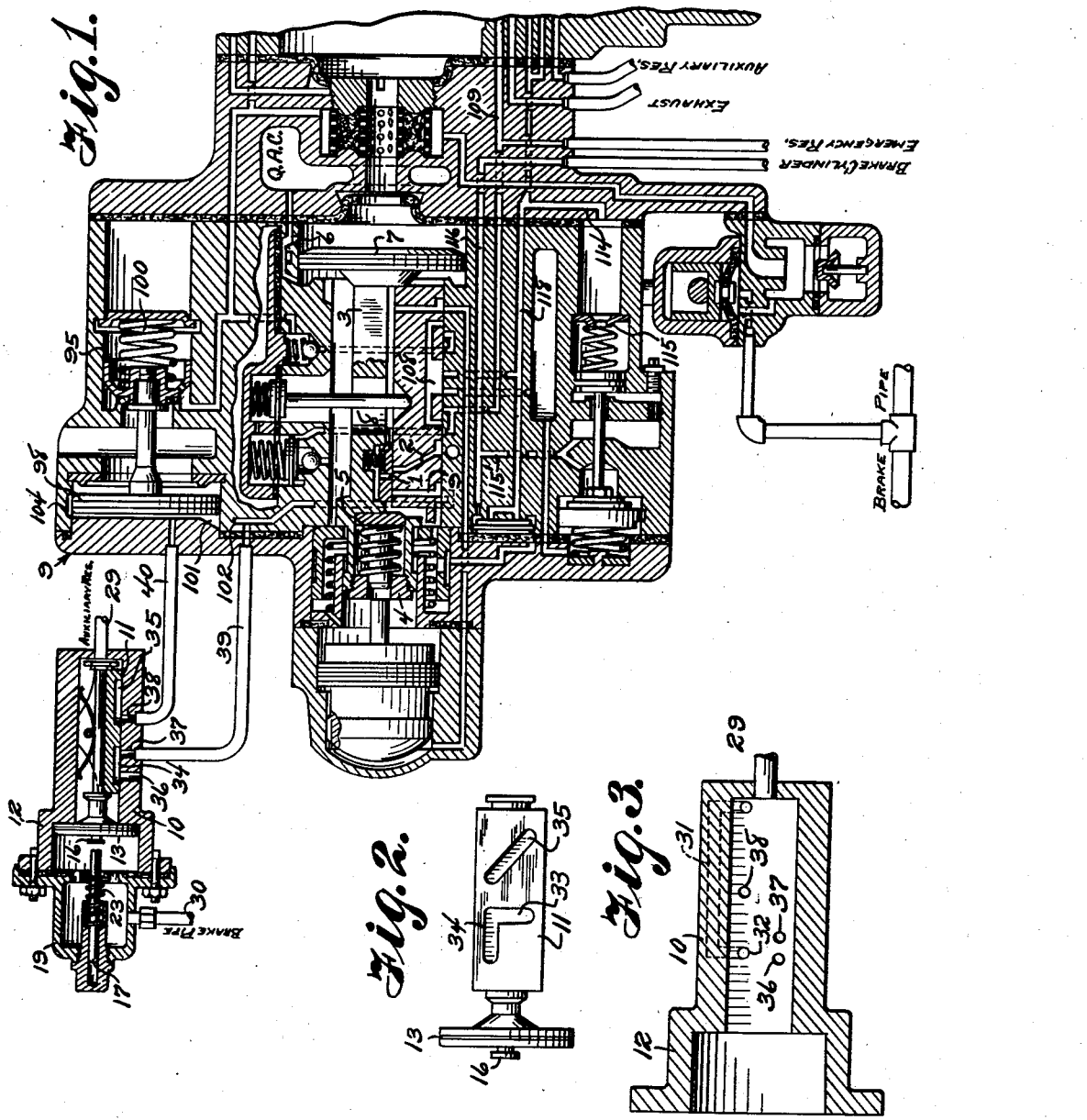
Keith D. Horton
INVENTOR
BY *Victor J. Evans & Co.*
ATTORNEYS Jan. 6, 1942.  K. D. HORTON  2,268,826
VENT VALVE CONTROL FOR TRIPLE VALVES
Filed Feb. 19, 1940  2 Sheets-Sheet 2
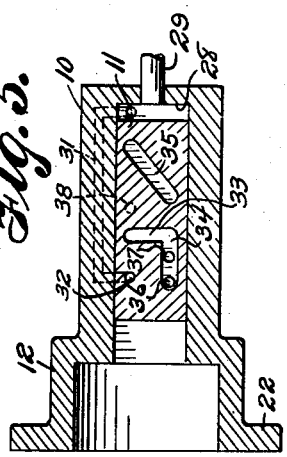
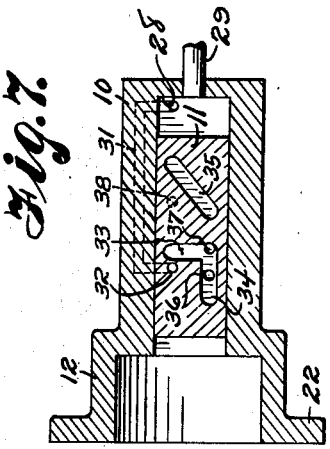
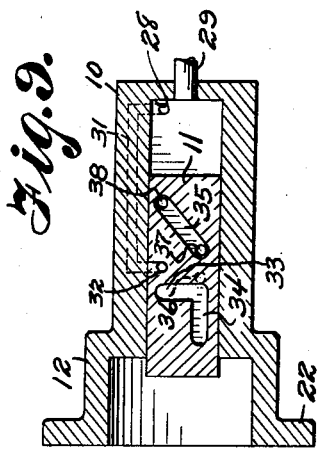
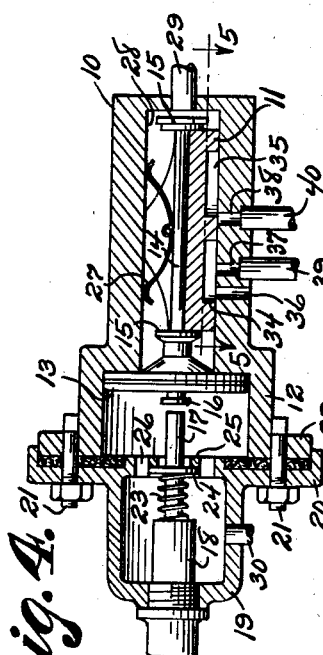
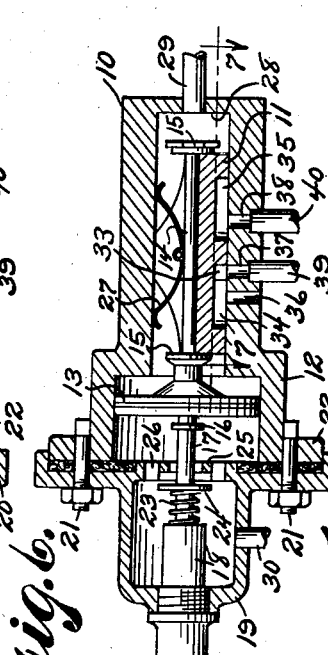
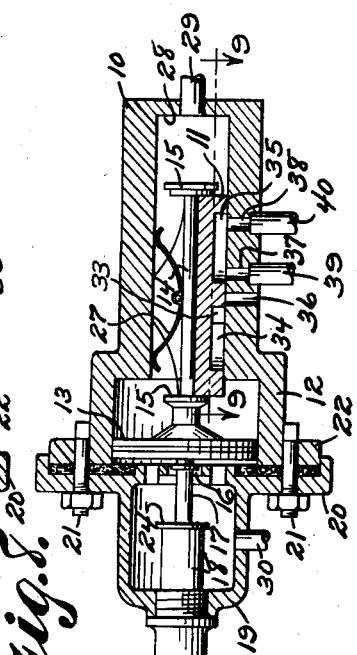

Patented Jan. 6, 1942

2,268,826

UNITED STATES PATENT OFFICE 2,268,826

VENT VALVE CONTROL FOR TRIPLE VALVES

Keith D. Horton, Amarillo, Tex.

Application February 19, 1940, Serial No. 319,778

3 Claims. (Cl. 303—42)

This invention relates to a vent valve control for triple valves of air brakes.

An object of the present invention is to improve the construction of air brake triple valves of the type shown by Patent No. 2,045,185, dated June 23, 1936, by the provision of an additional means for controlling the vent valve. One of the disadvantages of the conventional construction is that when the vent valve piston has opened the vent valve and brake pipe pressure is being exhausted, the piston remains open during an appreciable time interval and cannot be closed. The vent valve control device according to this invention permits a sudden head of air, introduced from the brake pipe, to move the piston back and allow the vent valve spring to close the vent valve, thus preventing, when not desired, the complete exhaustion of brake pipe pressure.

In the conventional type of triple valve quick action valve device there is a constantly open passage leading from the emergency main slide valve to the face of the vent valve piston. The present invention contemplates closing the outlet of this passage at the piston and connecting the passage at the closed end to a slide connector mechanism which is in turn connected to the vent valve piston chamber at the face of the piston.

The slide connector mechanism includes a piston responsive to brake pipe pressure, and a slide connector operated by the piston to connect various ports arranged in such a pattern that in normal or running position of the triple valve, the slide connector connects said passage with the atmosphere, in service application position of the triple valve, the slide connector connects said passage with the atmosphere, and in emergency position of the triple valve the slide connector connects said passage with the vent valve piston chamber at the face of the piston to permit a sudden head of pressure to move the piston, open the vent valve, and thus secure complete exhaustion of brake pipe pressure.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a diagrammatic view of the emergency portion of an air brake triple valve, mainly in section, embodying a slide connector mechanism constructed in accordance with the invention, the various parts being shown in normal release position.

Figure 2 is a bottom plan view of the slide connector piston and the slide connector showing the arrangement of the passages in the slide connector.

Figure 3 is a longitudinal sectional view of the slide connector chamber showing the arrangement of the ports therein.

Figure 4 is a longitudinal sectional view of the slide connector mechanism in release or running position.

Figure 5 is a cross sectional view taken approximately on the line 5—5 of Figure 4.

Figure 6 is a longitudinal sectional view of the slide connector mechanism in service application position.

Figure 7 is a longitudinal sectional view taken approximately on the line 7—7 of Figure 6.

Figure 8 is a longitudinal sectional view of the slide connector mechanism in emergency position.

Figure 9 is a longitudinal sectional view taken approximately on the line 9—9 of Figure 8.

Referring now to the drawings in which like characters of reference designate similar parts in the various views, the slide connector mechanism is shown to comprise a case 10 in which is slidably fitted a slide connector 11. The case is formed integral with a piston chamber 12 which receives a piston 13. The piston rod 14 extends into the case and is equipped with spaced flanges 15 which engage respective ends of the slide connector 11. The piston is provided centrally on its face with a projection 16 which confronts the end of a retarding plunger 17 which is received in a tubular guide 18 disposed axially in a chamber 19. The chamber is provided with a flange 20 which is bolted, as shown at 21, to a flange 22 on the piston chamber 12. A helical spring 23 is sleeved on the plunger and terminally engages the end of the guide 18 and a stop collar 24 on the plunger to normally hold the collar seated against the chamber inner wall 25, which latter is provided with ports 26 to establish communication between the chamber 19 and the piston chamber 12. An arcuate leaf spring 27 is engaged between the slide connector 11 and the inner surface of the case to force the slide connector to frictionally engage the case. The case is of greater internal dimension than the slide connector to form a chamber 28.

The chamber 28 is connected by a pipe 29 to the auxiliary reservoir and the chamber 19 is connected by a pipe 30 to the brake pipe. Thus brake pipe, or train line pressure, and auxiliary reservoir pressure are exerted against opposite faces of the piston 13. A by-pass 31 communicates at one end with the chamber 28 and communicates at the opposite end with a port 32 in the seat of the slide connector.

As best shown in Figure 2, the slide connector 11 is provided on one face with a longitudinal groove or passage 34 and is also provided with a groove or passage 33 connecting into 34 and extending horizontally and perpendicular thereto. The slide connector is also provided with a groove or passage 35 which is disposed obliquely to and spaced from the passage 34. The purpose of the groove 35 in connection with the spring 23 is that, see Figure 6, on a service application when equalization through the triple valve is attained the retarding stem and spring arrests the movement of the slide connector. The port 32 in the base of the slide connector seat is so situated that it will register auxiliary pressure with the exhaust through the groove 34. If the slide valve in the service portion of the triple valve should stick and prevent equalization on the train lines reduction the increase in differential will be a gradual one and the piston and slide connector 11 will move slowly toward the compression spring 23. In this movement the port 32 and the groove 35 will register passing auxiliary pressure to the atmosphere thus decreasing the differential of the auxiliary pressure. Since the spring 23 is partly compressed upon attainment of equalization the expansion of the spring will disconnect the port 32 and the exhaust. In an emergency movement the reduction of the train line is made at such a rate the groove 35 will pass over the port 32, blanking it and preventing loss of auxiliary pressure, see Figure 9. The case 10 is provided, as best shown in Figure 3, with a pair of juxtaposed ports 36 and 37 and with a single port 38, the latter being spaced both transversely and longitudinally of the case from the ports 36 and 37. The port 36 is open to the atmosphere. The port 37 is connected by an outlet pipe 39 to the conventional passage 102 which, as before mentioned, ordinarily leads to the face of the vent piston 98 which controls the operation of the quick action vent valve 95 of the conventional quick action valve device 9 of a triple valve. As previously stated, in carrying out the invention the passage 102 is blanked from the face of the valve so pressure must pass through the outlet pipe 39 and into the slide connector mechanism. A return pipe 40 is connected to the port 38 and is connected to the vent valve piston chamber 101 in front of the face of the piston, the chamber being open to the atmosphere by way of a leakage groove 104 around the piston as usual.

In operation, when a service rate reduction of brake pipe pressure causes the pressure on the face of emergency piston 7 to become slightly lower than quick action chamber pressure on the slide valve side of the piston, the piston and graduating valve 8 move to the right until the emergency piston spring guide 4, strikes the left end of the emergency slide valve 3. In this position the piston closes the charging choke 6, and the vent port 1 through the graduating valve registers with port 2 in the slide valve. The port 2 is connected to the exhaust port in the slide valve seat, thereby reducing quick action chamber pressure back of the piston, at the same rate as brake pipe pressure is being reduced on the face of the piston. This action keeps quick action chamber pressure from attaining a differential over brake pipe pressure sufficient to compress the emergency piston spring 5 enough to cause the graduating valve to uncover port 9, which formerly would cause an undesired emergency application, by passing quick action chamber pressure to the face of the vent valve piston 98, compressing spring 100 and opening the vent valve 95.

By use of my slide connector mechanism, in a service reduction, brake pipe pressure reducing from the face of the piston 13, allows auxiliary reservoir pressure to move the piston and slide connector 11 forward until the projection 16 on the piston engages the spring pressed plunger 17. In this position, as shown in Figures 6 and 7, the port 37 and port 36 are connected by the passage 34 to pass quick action chamber pressure from the passage 102 through the pipe 39 to the atmosphere.

If, due to friction on the emergency slide valve 3 or graduating valve 8, or by stoppage of a passageway sufficient to prevent passing sufficient quick action chamber pressure to equalize piston 7, and a differential is attained by the quick action chamber pressure, and the piston 7 and graduating valve 1, are moved far enough to uncover port 9, leading to passage 102, instead of the quick action chamber pressure opening the vent valve piston 98 as formerly, the quick action chamber pressure will pass through port 37, passage 34 and port 36 to the atmosphere, as normally it does through port 2 to the exhaust, preventing the unequalizing of the piston 7 by vent valve 95 opening and exhausting brake pipe pressure from the face of both emergency and service pistons, forcing these pistons to keep equalized to brake pipe pressure.

Ordinarily, if the service portion of a triple valve is operating normally and upon a service reduction, if the quick action chamber pressure is prevented from equalizing with the brake pipe reduction due to a stuck emergency valve 3, the piston 13 of my slide connector mechanism will move forward against the less brake pipe pressure until the projection 16 contacts with the plunger 17, as shown in Figures 6 and 7. In this position the port 37 and port 36 are connected by the passage 34 to pass quick action chamber pressure from the passage 102 through the pipe 39 to the atmosphere. Should the emergency piston 7 and graduating valve 8, break loose from the differential obtained upon the piston 7 and uncover port 9, quick action chamber pressure will pass to the atmosphere and prevent the vent valve 95 opening and thus by conserving the brake pipe pressure upon the face of the piston to force it to equalize or move backward to its desired position.

*Emergency*

As shown in Figures 8 and 9, when an emergency rate brake pipe reduction takes place from any cause, the piston 16 of my slide connector mechanism, by means of the superior auxiliary pressure is moved forward far enough to compress the retaining spring 23, and move the slide connector 11 sufficiently to cause the channel 35 to connect the ports 37 and 38 while the channel 34 is moved past the port 36, and the slide connector blanks the exhaust port 36. Quick action chamber pressure cannot reduce through the vent port 1, in the graduating valve and port 2 in the slide valve to the atmosphere at the same rate as the brake pipe pressure is being reduced. Therefore, sufficient differential is built up across the emergency piston 7 to compress the spring 5 and allow the graduating valve 8 to move far enough on the slide valve to uncover port 9 in the slide valve which registers with passage 102. This allows quick action chamber pressure to flow through passage 102, pipe 39, port 37, channel 35, port 38 and pipe 40 against the face of the vent valve piston 98. The resulting movement of the piston 98 unseats the vent valve 95, thereby opening a large and direct passage for brake pipe pressure to the atmosphere. The rapid venting of brake pipe air causes an emergency reduction rate of brake pipe pressure to pass serially and rapidly through the train and insures the prompt movement of other valves to emergency position.

The rapid reduction of brake pipe pressure causes the emergency piston 7 and slide valve 3 to move to the extreme right position, see Figure 1, and this carries the slide valve port 9 out of register with the passage 102, but this port 102 is uncovered by the slide valve so that quick action chamber pressure remains connected to the vent valve piston 98.

In this position the emergency slide valve 3 connects the emergency reservoir air from passage 109 through the slide valve cavity 108 lefthand passage, through cavity 108 to passages 118 and 114, to the unseated inshot piston valve 115, passage 115' and passage 116, to the brake cylinder. Meanwhile, the emergency rate of reduction in brake pipe pressure has caused the service piston and slide valve to move to the extreme left position where the graduating valve uncovers the service port, not shown, leading to passage 118, through which auxiliary air flows, combining with emergency air. The combined air pressures now float past the unseated inshot valve 115 to passage 115' and to the brake cylinder.

The further movements of the emergency movement, have no relation with the slide connector mechanism of this invention, hence will not be explained. When the slide connector mechanism has attained the emergency position, it will so remain until brake pipe pressure is again introduced into the train line, at which time the slide connector 11 will blank port 38 to the vent valve piston 98, and register ports 36 and 37 with the passage 34. The vent valve spring 100, when the pressure for which it is set is attained, closes the vent valve against quick action chamber pressure.

From the above it will be seen that the device prevents the opening of the vent valve 95, upon a service rate of reduction, by the graduating valve 8 failing to pass sufficient quick action chamber pressure through port 2 to the exhaust. The first movement of the emergency piston carries the graduating valve 8 past port 2 and opens port 9, to open the vent valve 95 and pass brake pipe pressure to the atmosphere through it. The loss results in the emergency and service pistons both assuming the emergency position. It can be readily seen that when the vent valve 95 can be prevented from opening, as above explained, no train line pressure will be lost, and the emergency piston will not move against the superior pressure of the brake pipe air upon its face, beyond the point of opening the graduating valve.

A further word of explanation. As may be seen from Figures 5, 7 and 9 in the release position groove 33 connecting into groove 34 is closed by the slide valve blanking port 32. In the service position the retarding spring 23 has stopped the movement of the slide valve with ports 36 and 37 remaining connected through groove 34, and groove 33 in close conjunction to port 32. Should the differential of the auxiliary occur and the slide valve move towards emergency, groove 33 registers with port 32 and passes auxiliary pressure to the atmosphere through groove 34 and exhaust 36. In the emergency position, groove 33 is carried past port 32, which port the slide valve blanks.

From the above description it is thought that the construction and operation of the invention will be fully understood without further explanation.

What is claimed is:

1. The combination with an air brake triple valve having a vent piston, and a vent piston supply passage, of a supplemental control valve through which said passage is by-passed comprising a case having a plurality of ports connected respectively to the atmosphere, to said supply passage and to the face of the vent piston, a piston in the case balanced between brake pipe pressure and auxiliary reservoir pressure, and a slide connector in the case actuated by the balanced piston and provided in one side with an obliquely arranged passage and an L-shaped passage cooperating with said ports in such manner that the supply passage is connected to the atmosphere except in the case of an emergency reduction of brake pipe pressure, in the last mentioned case the normal connection being established so that the vent valve may operate.

2. The combination with an air brake triple valve having a vent piston, and a vent piston supply passage, of a piston balanced between brake pipe pressure and auxiliary reservoir pressure, a slide connector carried by the piston having in one side an obliquely arranged passage and an L-shaped passage, and a case housing the balanced piston and the slide connector having a plurality of ports connected respectively to the atmosphere, to said supply passage, and to the face of the vent piston, said ports being selectively cross connected by the obliquely arranged and L-shaped passages of the slide connector in such manner that the supply passage is connected to the atmosphere except in the case of an emergency reduction of brake pipe pressure, in the last mentioned case the normal connection being established so that the vent valve may operate.

3. The combination with an air brake triple valve having a vent piston, and a vent piston supply passage, of a supplemental control valve through which said passage is by-passed, said control valve comprising a case having two ports connected to the atmosphere and ports connected to said supply passage and to the face of the vent piston, a piston in the case balanced between brake pipe pressure and auxiliary reservoir pressure, and a slide connector in the case actuated by the balanced piston and provided in one side with an obliquely arranged passage and an L-shaped passage co-operating with the ports in such manner that the supply is connected to the atmosphere except in the case of an emergency reduction of brake pipe pressure, in the last mentioned case the normal connection established so that the vent valve may operate.

KEITH D. HORTON.